United States Patent [19]
Sasaki

[11] Patent Number: 5,659,527
[45] Date of Patent: Aug. 19, 1997

[54] OPTICAL DISK DRIVE WITH USE OF SAMPLED PRECEDING FOCUS OR TRACKING ERROR SIGNAL IN RESPONSE TO DETECTION OF SPIKED NOISE OR OFFSET

[75] Inventor: Takeshi Sasaki, Tokyo, Japan

[73] Assignee: NEC Corporation, Tokyo, Japan

[21] Appl. No.: 607,489

[22] Filed: Feb. 27, 1996

[30] Foreign Application Priority Data

Feb. 27, 1995 [JP] Japan .................................. 7-038360

[51] Int. Cl.$^6$ .................................................. G11B 7/095
[52] U.S. Cl. .................................. 369/44.34; 369/44.32
[58] Field of Search .......................... 369/44.25, 44.32, 369/44.34, 44.35, 54, 58

[56] References Cited

U.S. PATENT DOCUMENTS 4,023,033  5/1977  Bricot et al. .
4,989,193  1/1991  Tinet .
5,483,510  1/1996  Ogino .................................. 369/44.34
5,511,052  4/1996  Perry .................................. 369/44.34
5,570,330  10/1996 Okawa .................................. 369/44.32

FOREIGN PATENT DOCUMENTS 60-154336  8/1985  Japan .

*Primary Examiner*—W. R. Young
*Attorney, Agent, or Firm*—Young & Thompson

[57]  ABSTRACT

By making the servo system insensitive to the spiked noise having high frequency components, a stable focus control and/or tracking control of an optical disk drive is realized. A digital signal processor is provided for sampling an output of an error detecting circuit for detecting an amount of deviation of control with a constant period to perform a phase compensation therefor and outputting a drive instruction value for the focus or track control on the basis of a signal sampled in a just preceding period when an error signal value sampled in a current period is larger than the error signal value sampled in the just preceding period.

6 Claims, 4 Drawing Sheets

OPTICAL DISK DRIVE WITH USE OF SAMPLED PRECEDING FOCUS OR TRACKING ERROR SIGNAL IN RESPONSE TO DETECTION OF SPIKED NOISE OR OFFSET

BACKGROUND OF THE INVENTION

The present invention relates to an optical disk drive and, particularly, to an optical disk drive having a focus control function as well as a tracking control function.

In an optical disk drive of an optical recording and reproducing apparatus, an amount energy of laser light emitted from a laser during an information recording mode operation is in the order of 10 times that during an information read mode operation. Therefore, a focus error detecting circuit for detecting a focus error of a laser light and a track error detecting circuit for detecting a track error of the laser light of the optical recording and reproducing apparatus, which are adjusted in gain to the information read mode operation, are used in the information recording mode operation, these detecting circuits may be saturated and servo gains thereof may be fluctuated. On the other hand, when a focus error detecting circuit for detecting a focus error of a laser light and a track error detecting circuit for detecting a track error of the laser light of the optical recording and reproducing apparatus, which are adjusted in gain to the information recording mode operation, are used in the information read mode operation, these detectors could not operate appropriately. In order to make the focus error detecting circuit and the track error detecting circuit operable appropriately in both the information recording mode operation and the information read mode operation, a gain switching function has been provided in each of them so that loop gains of this control system can be regulated.

U.S. Pat. No. 4,023,033 discloses an example of the focus error detector and U.S. Pat. No. 4,989,193 discloses an example of the track error detector. A gain switching operation of the focus error detector of U.S. Pat. No. 4,023,033 or of the track error detector of U.S. Pat. No. 4,989,193 is performed at a start time and at an end time of the information recording operation. In such case, there may be a case where spiked offset are generated on a focus error signal and a track error signal, depending upon a circuit delay. Further, there may be a case where spiked noise from a peripheral circuit is mixed in the focus error signal and/or the track error signal. When a focus and/or tracking servo operation is performed on the basis of an input signal mixed with such spiked noise, an objective lens of the optical information recording and reproducing apparatus may be accelerated too much, resulting in off-track and/or off-focus.

In order to prevent such off-focus and/or off-track, it is desired that the servo control system is not sensitive to such spiked noise. In order to realize this, a servo frequency band in a conventional optical recording and reproducing apparatus is set to a value lower enough than a frequency band of the spiked noise.

On the other hand, with the recent development of technology, it has been requested to increase an information recording speed as well as an information read speed of an optical recording and reproducing apparatus. This means that there is a tendency of increase of rotation speed of a recording medium, and the servo frequency band should be increased. In order to make the servo system insensitive to the spiked noise having high frequency components in increasing the frequency of the servo system servo frequency band, any new measure should be provided. However, there is no such measure proposed as yet.

As mentioned, in the conventional technology, it is usual in order to make the servo system insensitive to the spiked noise containing high frequency components to set the frequency band of the servo system low. However, since the frequency band of the existing servo system is increased in order to improve the information recording and reading speed, the servo system responds to the spiked noise containing high frequency components and these may be the off-focus and/or off-track. In the situation of the off-track, the laser beam may scan other tracks than an aimed track.

SUMMARY OF THE INVENTION

An object of the present invention is to provide an optical disk drive which can effectively exclude a response of a control system to a spiked noise to thereby make a stable servo control possible and make a high quality write/read operation possible.

According to one aspect of the present invention, there is provided an optical disk drive comprising:

a) an optical head for performing a read/write operation of information by irradiating a recording medium with a laser beam;

b) a focus error detecting circuit for detecting an off-focus of the laser beam;

c) a digital signal processor for sampling a focus error signal output from the focus error detecting circuit at constant periods and storing it, performing a phase compensating operation and outputting a drive instruction value for a focus servo operation; and d) a focus actuator for moving a spot position of the laser beam from the optical head in a vertical direction relative to the recording medium on the basis of the drive instruction value, wherein the digital signal processor is provided with:

a focus error signal storing function for storing an absolute value of the focus error signal sampled in a preceding period in an internal memory thereof; and a focus error signal specifying function for selecting the focus error signal value sampled in the preceding period as a focus error signal value of a current period when an absolute value of a difference between the focus error signal value sampled in the current period and the focus error signal value sampled in the preceding period exceeds a predetermined value and the absolute value of the focus error signal value sampled in the current period is larger than the absolute value of the focus error signal value sampled in the preceding period and for specifying the drive instruction value on the basis of the selected focus error signal value.

According to another aspect of the present invention, there is provided an optical disk drive comprising:

a) an optical head for performing a read/write operation of information by irradiating a recording medium with a laser beam;

b) a track error detecting circuit for detecting an off-track of the laser beam;

c) a digital signal processor for sampling a track error signal output from the track error detecting circuit at constant periods and storing it, performing a phase compensating operation and outputting a drive instruction value for a focus servo operation; and d) a track actuator for moving a spot position of the laser beam from the optical head in a radial direction of the recording medium on the basis of the drive instruction value, wherein the digital signal processor is provided with:

a track error signal storing function for storing an absolute value of the track error signal sampled in a preceding period in an internal memory thereof; and a track error signal specifying function for selecting the track error signal value sampled in the preceding period as a track error signal value of a current period when an absolute value of a difference between the track error signal value sampled in the current period and the track error signal value sampled in the preceding period exceeds a predetermined value and the absolute value of the track error signal value sampled in the current period is larger than the absolute value of the track error signal value sampled in the preceding period and for specifying the drive instruction value on the basis of the selected track error signal value.

In the optical disk drive according to the present invention, the digital signal processor detects a spiked noise containing high frequency component, performs the phase compensation by using an input signal value sampled in a preceding period as an input signal value sampled in a current period and outputs a drive instruction value for a servo operation, to make the control system insensitive to the spiked noise containing high frequency component. Therefore, the present invention can realize a focus control and a tracking control which are always stable.

DESCRIPTION OF THE PREFERRED EMBODIMENTS

Figure 2:
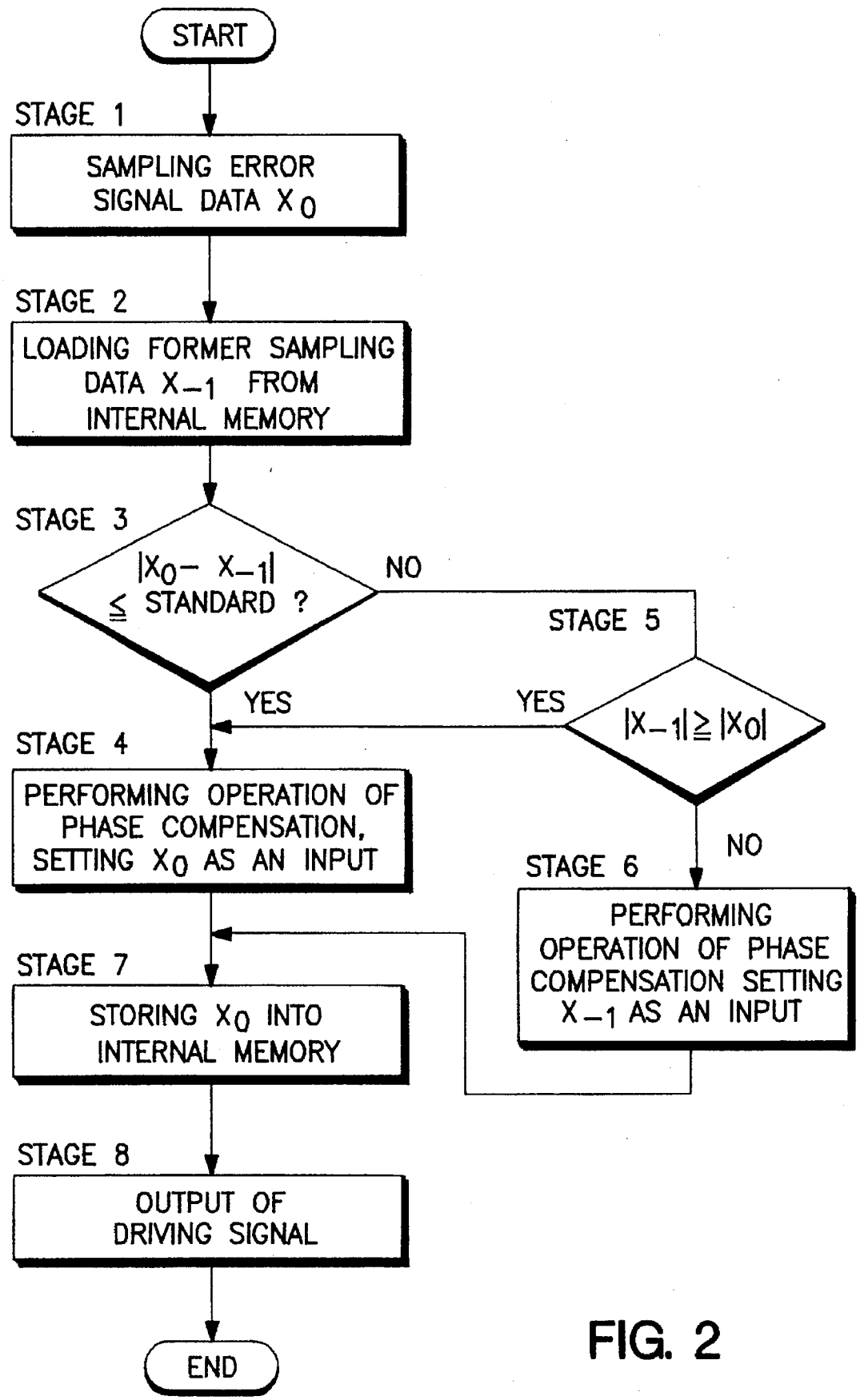
FIG. 2 is a flowchart showing a processing performed by a digital signal processor shown in FIG. 1.
Figure 3:
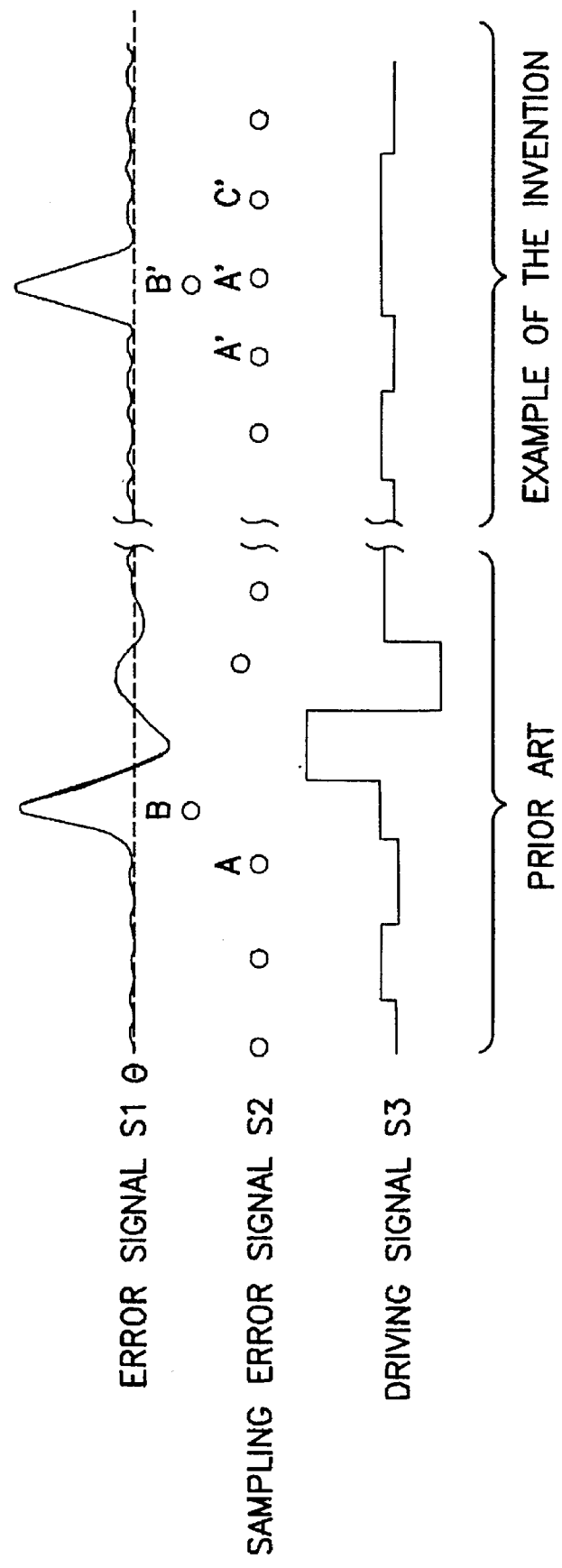
FIGS. 3A and 3B show signal waveforms showing operations of main portions of the block diagram shown in FIG. 1.

An embodiment of the present invention will be described with reference to FIGS. 1 to 3.

Figure 1:
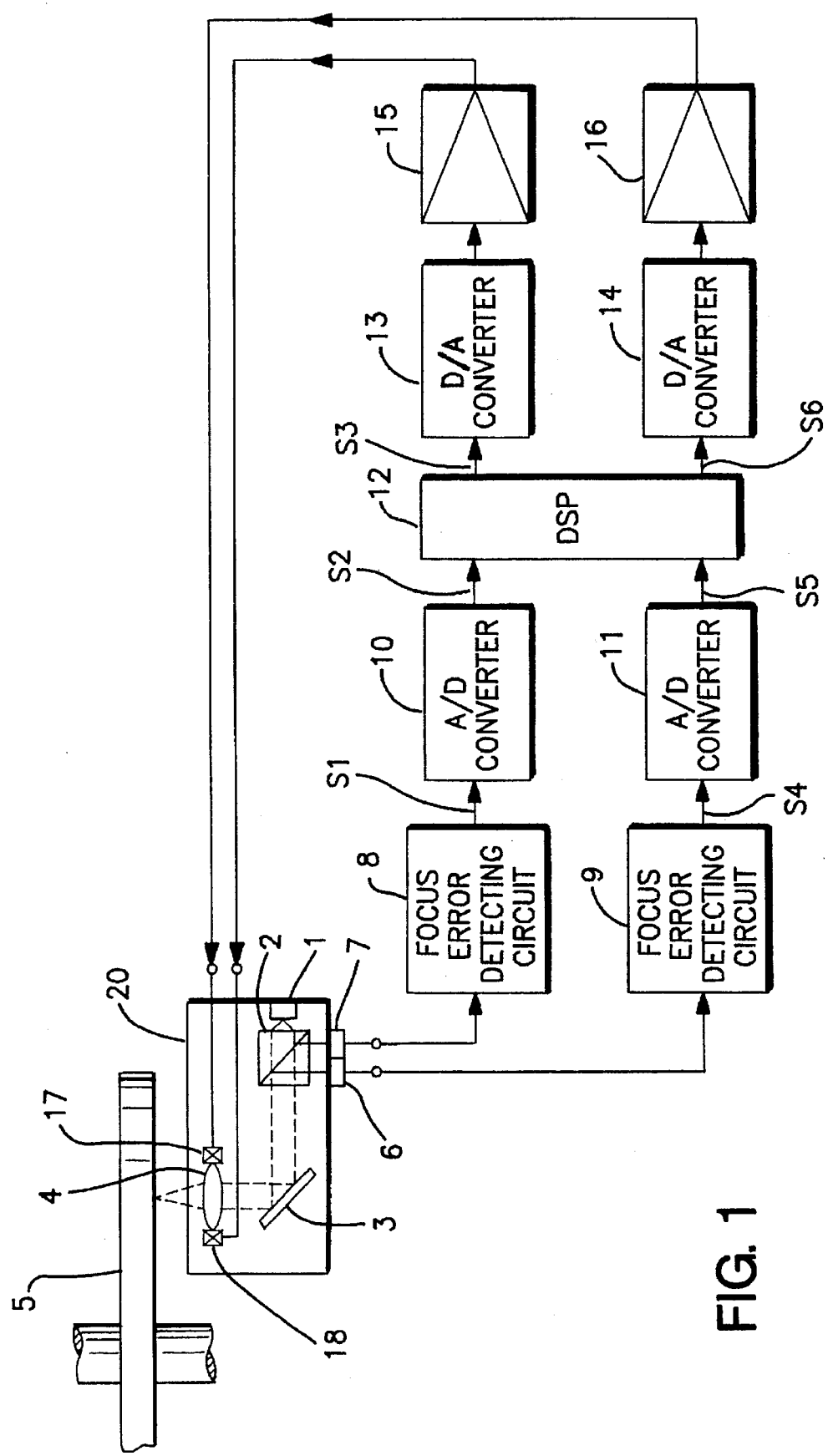
FIG. 1 is a block diagram showing an embodiment of the present invention.

The embodiment shown in FIG. 1 comprises an optical head 20 for irradiating a recording medium with a laser beam emitted from a laser diode 1 to perform an information read/write operation, a track error control system and a focus error control system. The track error control system includes a track error detecting circuit 9 for generating a track error signal S4 on a basis of an output of a track error detector 6 provided on the optical head 20, an A/D converter 11 for converting the track error signal S4 output from the track error detecting circuit 9 into a digital signal S5 and a digital signal processor 12 for sampling the digital track error signal S5 from the A/D converter 11 at constant periods, performing a phase compensation therefor and outputting a drive instruction value S6 for a tracking servo.

The track error control system further comprises a D/A converter 14 for converting the digital drive instruction value S6 output from the digital signal processor 12 into an analog value, a power amplifier 16 for amplifying an output of the D/A converter 14 and a track actuator 17 provided in the optical head 20 for moving an objective lens 4 in a radial direction of the recording medium 5 according to an output signal of the power amplifier 16.

On the other hand, the focus error control system of the shown embodiment comprises a focus error detecting circuit 8 for generating a focus error signal S1 on a basis of an analog output of a focus error detector 7 mounted on the optical head 20, an A/D converter 10 for converting the focus error signal S1 from the focus error detecting circuit 8 into a digital signal S2 and the digital signal processor 12 for sampling the digital focus error signal S2 from the A/D converter 10 at constant periods, performing a phase compensation therefor and outputting a drive instruction value S3 for a focus servo.

The focus error control system further includes a D/A converter 13 for converting the drive instruction value S3 output from the digital signal processor 12 into a analog signal value, a power amplifier 15 for amplifying an output of the D/A converter 13 and a focus actuator 18 provided in the optical head 20 for moving the objective lens 4 in a vertical direction relative to the recording medium 5 according to an output signal of the power amplifier 15.

The optical head 20 comprises the previously mentioned laser diode 1, a reflection mirror 3 for changing an angle of a laser beam emitted from the laser diode 1, the objective lens 4 for focusing the laser beam reflected by the reflection mirror 3 onto the recording medium 5 and a beam splitter 2 for deriving a reflection light reflected by the recording medium 5. The focus error detector 7 and the track error detector 6 function to derive the focus error signal and the tracking error signal, respectively, from the reflection light derived through the beam splitter 2.

Now, an operation of this embodiment will be described with reference to FIG. 2 which shows a flowchart of a processing to be performed in the digital signal processor (referred to as DSP, hereinafter) 12 and FIGS. 3A and 3B which show signal waveforms associated therewith.

During an execution of a focus servo operation, the DSP 12 samples a focus error signal data $X_0$ from the A/D converter 10 in a current period and loads it in its internal memory (STAGE 1). Then, a former focus error signal data $X_{-1}$ sampled in a preceding period is loaded in an internal register of the DSP 12 (STAGE 2). Subsequently, it is determined in STAGE 3 whether or not a difference $|X_0-X_{-1}|$ between the focus error signal data $X_0$ sampled in the current period and the focus error signal data $X_{-1}$ sampled in the preceding period exceeds a predetermined value. If the difference does not exceed the predetermined value, the phase compensation for the focus servo is performed by using the data $X_0$ as an input value (STAGE 4) and the focus actuator drive instruction value is output to the D/A converter 13 (STAGE 8). In this case, the focus error signal data $X_0$ is stored in the internal memory of the DSP 12 (STAGE 7) as a focus error signal data $X_{-1}$ in a next period.

Figure 4:
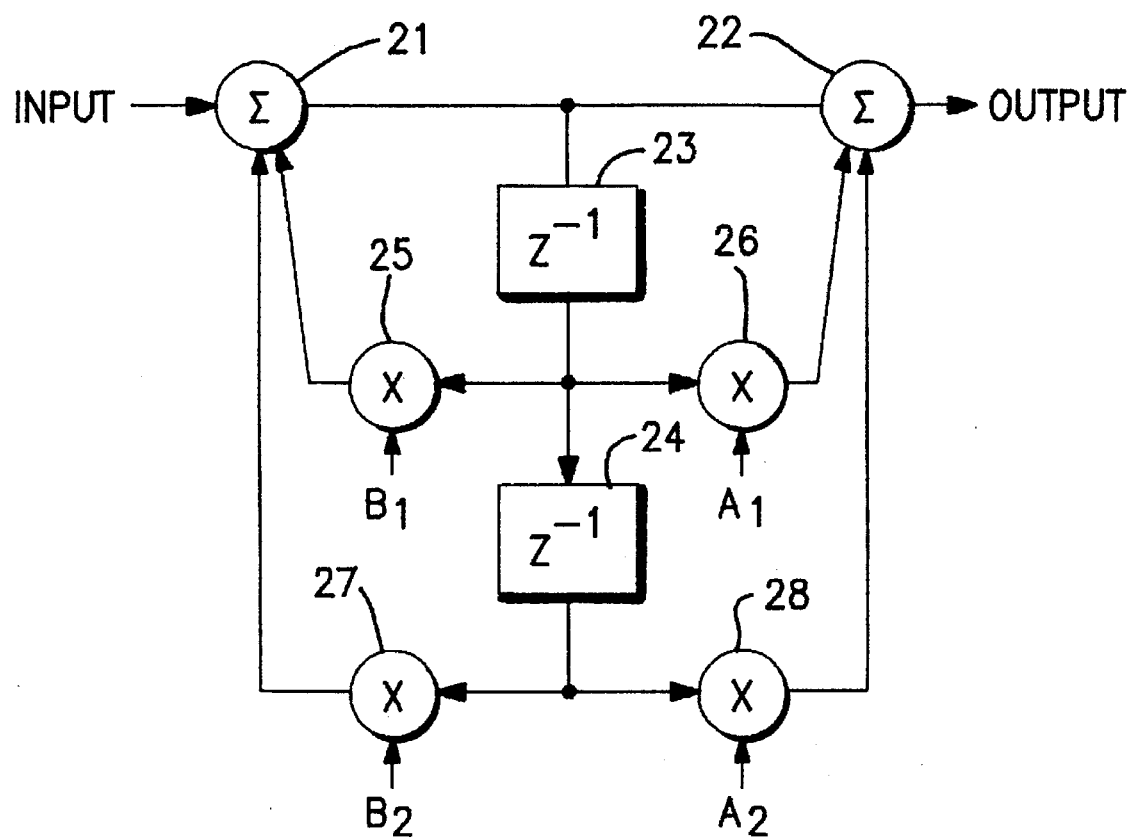
FIG. 4 shows a phase compensation processing in block diagram.

This phase compensation processing is disclosed in, for example, Japanese Patent Application Laid-open No. Sho 60-154336. FIG. 4 is a block diagram of a circuit construction for performing this processing. In general, the phase compensation processing is realized by a digital filter. In FIG. 4, the digital filter circuit includes adders 21 and 22, general shift registers 23 and 24 and multipliers 25~28. Input signals A1, A2, B1 and B2 to the respective multipliers are constants which determine a characteristics of the digital filter and are arbitrarily switched by the DSP so that an arbitrary filter characteristics can be obtained. An input digital signal is processed along arrows shown in FIG. 4. The phase compensation in the present invention means that, in order to obtain a stable servo characteristics, a phase lead compensation is performed for frequency components (generally, several hundreds Hz to several kHz) in the vicinity of a servo frequency band of the input signal (focus error signal and track error signal) during the focus servo and track servo are performed.

In STAGE 3, if an absolute value of the difference between the focus error signal data $X_0$ sampled in the current period and the focus error signal data $X_{-1}$ sampled in the preceding period exceeds the predetermined value, an absolute value of the focus error signal data $X_0$ sampled in the current period is compared with an absolute value of the focus error signal data $X_{-1}$ sampled in the preceding period in STAGE 5. If the absolute value of the focus error signal data $X_0$ is larger than the absolute value of the focus error signal data $X_{-1}$, the phase compensation for the focus servo is performed by using the data $X_{-1}$ sampled in the preceding period as a focus error signal sampled in the current period and the focus actuator drive instruction value is output to the D/A converter 13 (STAGE 6).

On the other hand, in STAGE 5, if the absolute value of the focus error signal data $X_0$ is not larger than the absolute value of the focus error signal data $X_{-1}$, the phase compensation for the focus servo is performed by using the data $X_0$ as the input value (STAGE 4) and the focus actuator drive instruction value is output to the D/A converter 13 (STAGE 8). In this case, the focus error signal data $X_0$ is stored in the internal memory of the DSP 12 as a focus error signal data $X_{-1}$ in a next period (STAGE 7).

The tracking servo operation is similar to the focus servo operation mentioned above and the above description of the focus servo operation is applicable to the tracking servo operation by using the A/D converter 11 and the D/A converter 14 in lieu of the A/D converter 10 and the D/A converter 13, respectively, and changing the expression of the focus error to the track error.

Now, the operation of this embodiment will be described with using the signal waveforms shown in FIGS. 3A and 3B.

FIG. 3A shows waveforms of the focus error signal S1, the sampling error signal S2 and the drive signal S3 in the prior art, when spiked noise is mixed in the focus error signal S1, and FIG. 3B shows those in this embodiment.

In FIG. 3A, since the DSP 12 performs the focus servo phase compensation by sampling the spiked noise as shown by B, the drive instruction value considerably varies correspondingly to the spiked noise, so that the focus actuator 18 accelerates the objective lens excessively, repulsing in the error signal being disturbed.

On the other hand, in the present embodiment, since a difference between the focus error signal value A' sampled in the period in advance of one period from the current period and the focus error signal value B' sampled in the period just preceding the current period is larger than the predetermined value and the absolute value of the signal B' is larger than the absolute value of the signal A' as shown in FIG. 3B and the servo phase compensation is performed by using the focus error signal value A', the focus actuator drive instruction value S3 is not disturbed considerably. Further, a difference between the focus error signal value C' sampled in the current period and the focus error signal value B' sampled in the just preceding period is larger than the predetermined value. However, since the absolute value of the signal C' is smaller than the absolute value of the signal B' as shown in FIG. 3B, the servo phase compensation is performed by using the focus error signal value C' sampled in the current period. Therefore, the focus actuator drive instruction value S3 is not disturbed considerably.

The tracking servo control is performed by the DSP processing similarly to the focus servo control.

As mentioned hereinbefore, according to the present invention, the drive instruction value for the focus servo control or the tracking servo control is determined by the digital signal processor, without lowering frequency of the servo frequency band, with using the error signal value sampled in the period just preceding the current period as the error signal value sampled in the current period under the predetermined condition. Therefore, it is possible to effectively exclude the influence of high frequency noise mixed in the focus error signal or the track error signal and to make the focus control and the track control more stable to thereby realize high quality write/read operation.

Modifications of the present invention herein disclosed will occur to persons skilled in the art and all such modifications are deemed to be within the scope of the present invention as defined by the appended claims.

What is claimed is:

1. An optical disk drive comprising:

a) an optical head for performing a read/write operation of information by irradiating a recording medium with a laser beam;

b) a focus error detecting circuit for detecting an off-focus of the laser beam;

c) a digital signal processor for sampling a focus error signal output from said focus error detecting circuit at constant periods and storing it, performing a phase compensating operation and outputting a drive instruction value for a focus servo operation; and d) a focus actuator provided in said optical head for moving a spot position of the laser beam in a vertical direction relative to the recording medium on the basis of the drive instruction value, wherein said digital signal processor is provided with:

a focus error signal storing function for storing an absolute value of the focus error signal sampled in a preceding period in an internal memory thereof; and a focus error signal specifying function for selecting the focus error signal value sampled in the preceding period as a focus error signal value of a current period when an absolute value of a difference between the focus error signal value sampled in the current period and the focus error signal value sampled in the preceding period exceeds a predetermined value and the absolute value of the focus error signal value sampled in the current period is larger than the absolute value of the focus error signal value sampled in the preceding period and for specifying the drive instruction value on the basis of the selected focus error signal value.

2. An optical disk drive as claimed in claim 1, wherein the focus error signal specifying function further comprises a function for selecting the focus error signal value sampled in the current period as a focus error signal value of the current period when an absolute value of a difference between the focus error signal value sampled in the current period and the focus error signal value sampled in the preceding period exceeds the predetermined value and the absolute value of the focus error signal value sampled in the current period is equal to or smaller than the absolute value of the focus error signal value sampled in the preceding period and for specifying the drive instruction value on the basis of the selected focus error signal value.

3. An optical disk drive comprising:

a) an optical head for performing a read/write operation of information by irradiating a recording medium with a laser beam;

b) a track error detecting circuit for detecting an off-track of the laser beam;

c) a digital signal processor for sampling a track error signal output from said track error detecting circuit at constant periods and storing it, performing a phase compensating operation and outputting a drive instruction value for a track servo operation; and d) a track actuator for moving a spot position of the laser beam from said optical head in a radial direction of said recording medium on the basis of the drive instruction value, wherein the digital signal processor is provided with:

a track error signal storing function for storing an absolute value of the track error signal sampled in a preceding period in an internal memory thereof; and a track error signal specifying function for selecting the track error signal value sampled in the preceding period as a track error signal value of a current period when an absolute value of a difference between the track error signal value sampled in the current period and the track error signal value sampled in the preceding period exceeds a predetermined value and the absolute value of the track error signal value sampled in the current period is larger than the absolute value of the track error signal value sampled in the preceding period and for specifying the drive instruction value on the basis of the selected track error signal value.

4. An optical disk drive as claimed in claim 3, wherein the track error signal specifying function further comprises a function for selecting the track error signal value sampled in the current period as a track error signal value of the current period when an absolute value of a difference between the track error signal value sampled in the current period and the track error signal value sampled in the preceding period exceeds the predetermined value and the absolute value of the track error signal value sampled in the current period is equal to or smaller than the absolute value of the track error signal value sampled in the preceding period and for specifying the drive instruction value on the basis of the selected track error signal value.

5. An optical disk drive comprising:

a) an optical head for performing a read/write operation of information by irradiating a recording medium with a laser beam;

b) a focus error detecting circuit for detecting an off-focus of the laser beam;

c) a track error detecting circuit for detecting an off-track of the laser beam;

d) a digital signal processor for sampling a focus error signal output from said focus error detecting circuit at constant periods and storing it, performing a phase compensating operation and outputting a drive instruction value for a focus servo operation, and for sampling a track error signal output from said track error detecting circuit at constant periods and storing it, performing a phase compensating operation and outputting a drive instruction value for a track servo operation;

e) a focus actuator provided in said optical head for moving a spot position of the laser beam in a vertical direction relative to the recording medium on the basis of the drive instruction value for the focus servo operation; and f) a track actuator for moving a spot position of the laser beam from said optical head radially of said recording medium on the basis of the drive instruction value for the track servo operation, wherein said digital signal processor is provided with:

a focus error signal storing function for storing an absolute value of the focus error signal sampled in a preceding period in a first internal memory thereof; and a focus error signal specifying function for selecting the focus error signal value sampled in the preceding period as a focus error signal value of a current period when an absolute value of a difference between the focus error signal value sampled in the current period and the focus error signal value sampled in the preceding period exceeds a predetermined value and the absolute value of the focus error signal value sampled in the current period is larger than the absolute value of the focus error signal value sampled in the preceding period and for specifying the drive instruction value on the basis of the selected focus error signal value;

a track error signal storing function for storing an absolute value of the track error signal sampled in a preceding period in a second internal memory thereof; and a track error signal specifying function for selecting the track error signal value sample in the preceding period as a track error signal value of a current period when an absolute value of a difference between the track error signal value sampled in the current period and the track error signal value sampled in the preceding period exceeds a predetermined value and the absolute value of the track error signal value sampled in the current period is larger than the absolute value of the track error signal value sampled in the preceding period and for specifying the drive instruction value on the basis of the selected track error signal value.

6. An optical disk drive as claimed in claim 5, wherein the focus error signal specifying function further comprises a function for selecting the focus error signal value sampled in the current period as a focus error signal value of the current period when an absolute value of a difference between the focus error signal value sampled in the current period and the focus error signal value sampled in the preceding period exceeds the predetermined value and the absolute value of the focus error signal value sampled in the current period is equal to or smaller than the absolute value of the focus error signal value sampled in the preceding period and for specifying the drive instruction value on the basis of the selected focus error signal value, and wherein the track error signal specifying function further comprises a function for selecting the track error signal value sampled in the current period as a track error signal value of the current period when an absolute value of a difference between the track error signal value sampled in the current period and the track error signal value sampled in the preceding period exceeds the predetermined value and the absolute value of the track error signal value sampled in the current period is equal to or smaller than the absolute value of the track error signal value sampled in the preceding period and for specifying the drive instruction value on the basis of the selected track error signal value.

\* \* \* \* \*